Patented May 30, 1933

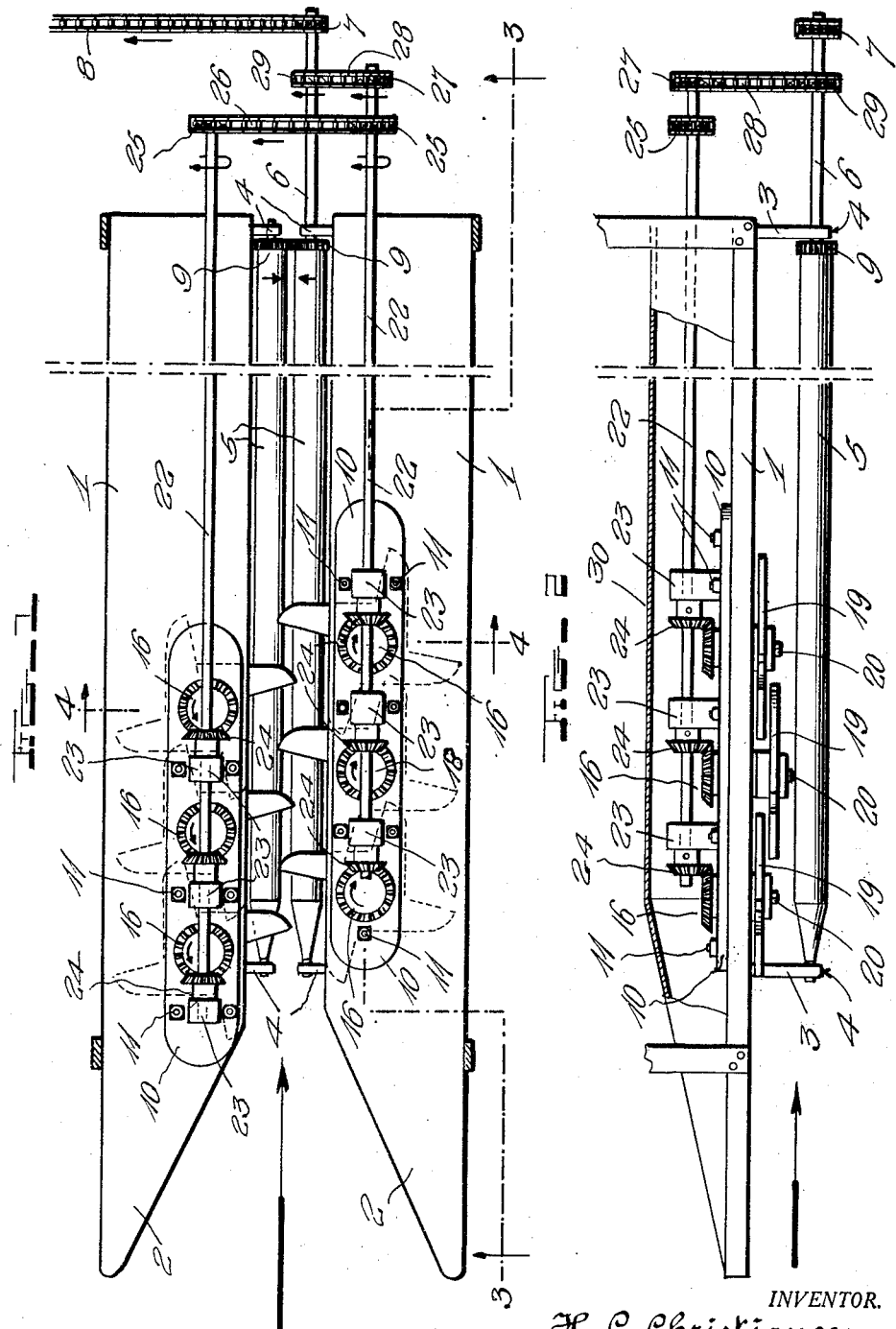

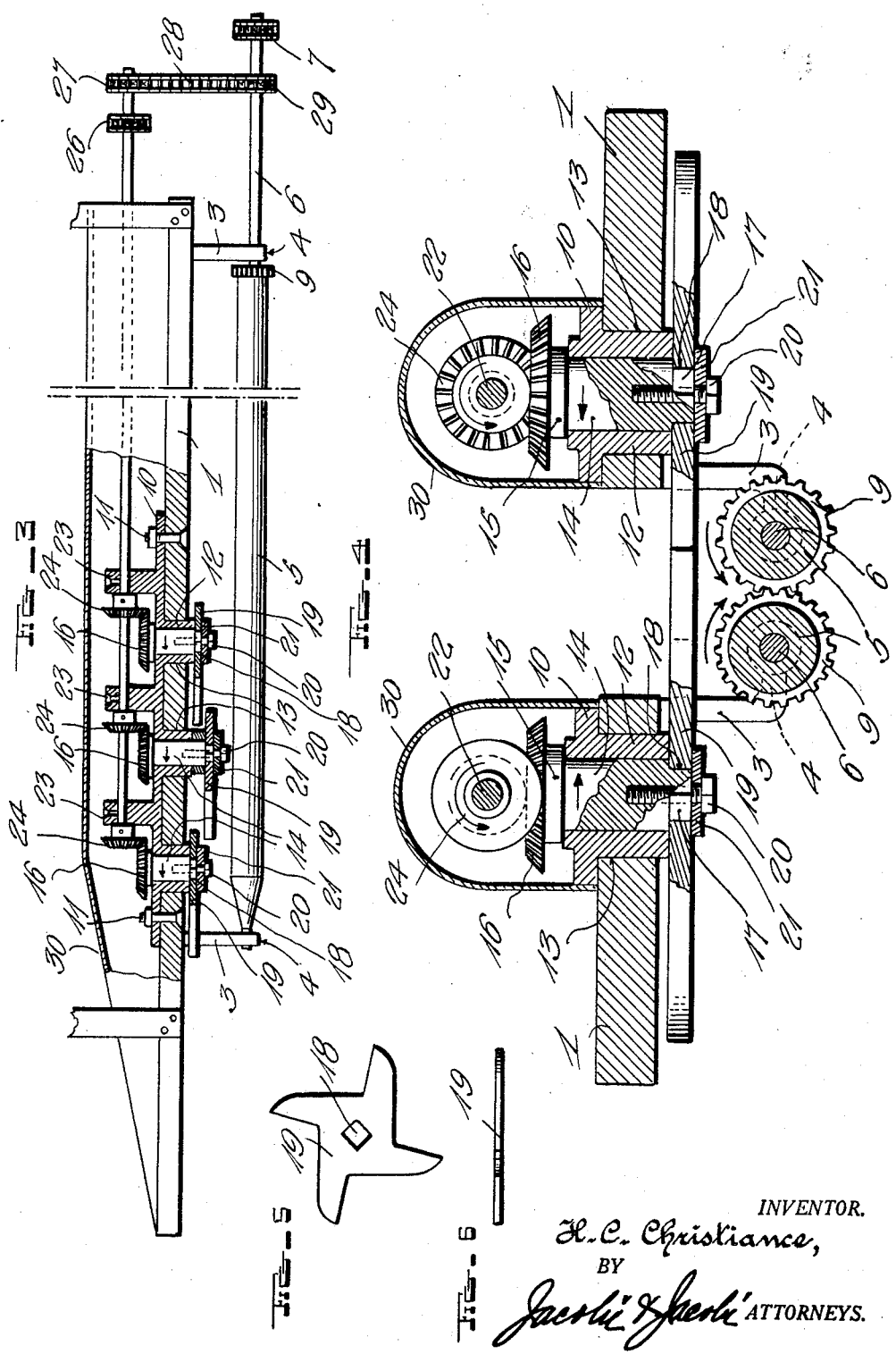

1,911,491

UNITED STATES PATENT OFFICE

HARRY C. CHRISTIANCE, OF COMPTON, ILLINOIS

CORN HARVESTER

Application filed February 9, 1931, Serial No. 514,664. Renewed January 20, 1933.

This invention relates to harvesters and more particularly to a corn harvester by means of which ears of corn may be gathered from the cornstalks.

One object of the invention is to provide a harvester of this character adapted to be mounted at one side of a wagon and pitched at a forward incline whereby as the wagon is driven across a field of growing corn ears may be snapped from the cornstalks for delivery into the wagon.

Another object of the invention is to provide a corn harvester having a special arrangement of snapping rollers and also special means for feeding the cornstalks between the snapping rollers longitudinally thereof as the harvester is moved across a field.

Another object of the invention is to provide improved means for rotatably mounting the feeders by means of which cornstalks are moved longitudinally between the snapping rollers and also improved means for imparting rotary motion to the feeding elements and causing the same to turn in proper timed relation to each other.

The improved corn harvester is illustrated in the accompanying drawings wherein:—

Figure 1 is a top plan view of the improved harvesting mechanism with shields for the means for moving the cornstalks between the snapping rollers removed.

Figure 2 is a side elevation of the harvester with a shield shown in section.

Figure 3 is a sectional view taken along the line 3—3 of Figure 1.

Figure 4 is a transverse sectional view taken along the line 4—4 of Figure 1.

Figure 5 is a plan view of one of the finger wheels mounted by means of which cornstalks are moved longitudinally between the snapping rollers, and Figure 6 is an edge view of the finger wheel shown in Figure 5.

This improved corn harvester is to be mounted at one side of a wagon open at its top so that the ears of corn may be delivered into the wagon and while it has been shown in a horizontal position in the drawings for convenience, it will be understood that the mould boards and the mechanism carried thereby will be disposed forwardly at a downward incline so that as the wagon is driven across a field ears of corn growing upon the cornstalks at different heights above the ground will be removed. It will also be understood that any suitable framework may be provided to carry the mould boards and connect the harvester with a wagon and in addition that suitable means may be provided for delivering the ears of corn from the harvester into the wagon body.

These mould boards 1 may be formed of wood or any other material found suitable. The boards extend in parallel spaced relation to each other and have their forward ends tapered as shown at 2 in Figure 2 thereby providing a mouth between the forward ends of the mould boards which tapers rearwardly so that cornstalks may be guided into proper position between the mould boards as the wagon is driven across a field. Hanger brackets 3 extend downwardly from the inner side portion of the mould boards near the front and rear ends thereof and have their lower end portion formed with side arms 4 which project toward each other as clearly shown in Figures 1 and 4. The hanger brackets receive the stub axles at the front and rear ends of the snapping rollers 5 thereby rotatably mounting these rollers between the mould boards but in a plane below the mould boards. The stub axle of one snapping roller is extended to form a drive shaft 6 carrying a sprocket wheel 7 about which is engaged a drive chain 8 leading from a suitable source of power upon the wagon to which the harvester is attached and interengaging gears or pinions 9 are carried by the rollers near their rear ends so that rotary motion may be transmitted from one roller to the other and the rollers caused to rotate in opposite directions as indicated by the arrows in Figure 1.

Upon the mould boards are disposed plates 10 which extend longitudinally of the mould boards and are firmly secured thereto by bolts or other suitable fasteners 11. These plates are formed with bearing sleeves 12 which project downwardly through openings 13 formed in the mould boards and through each bearing sleeve extends a hub 14 which is limited in its downward movement by a head 15 at its upper end. These heads have their upper portion enlarged to form bevelled gears or pinions 16 but it will be understood that the pinion may be formed separate from the head and suitably secured thereto. The lower ends of the hubs which project from the bearing sleeve are reduced and squared to form necks 17 to engage similarly shaped openings 18 formed in finger wheels 19 and in order to releasably secure the finger wheels there has been provided screws 20 which are screwed into threaded sockets formed in the hubs and have their heads engaging retainer plates which contact with the under faces of the finger wheels. It should be noted that the plates 10 are so located upon the mould boards that the sleeves and hubs rotatably received thereby of one plate are disposed in staggered relation to the sleeves and the hubs of the other plate. Therefore, the finger wheels of one mould board are disposed out of opposed relation to the finger wheels of the other mould board and as the hubs and finger wheels rotate the fingers of the wheels carried by the two mould boards will move through space between the mould boards in alternating relation to each other. This is clearly shown in Figure 1.

Referring to Figures 2, 3 and 4 it will be seen that the finger wheels while disposed below the mould boards are located in a plane above the snapping rollers so that the fingers of the wheel may engage cornstalks above the rollers and easily thrust the stalks rearwardly between the rollers as the harvester is driven across a field, longitudinally of the rows of corn. It will also be noted by an inspection of Figures 2 and 3 that finger wheels of each mould board are disposed out of a common plane so that they may overlap and turn freely without striking each other.

In order to transmit rotary motion to the hubs and finger wheels carried thereby there has been provided shafts 22 which extend longitudinally of the mould boards above the same and are rotatably mounted in bearings 23 rising from the plates 10. Bevel gears 24 which are fixed upon the shafts 22 mesh with the gears or pinions 16 and engage the pinions 16 in such relation thereto that when the shafts 22 are rotated the hubs and finger wheels will be rotated as indicated by the arrows in Figure 1. It will thus be seen that while the finger wheels of one mould board will turn in an opposite direction to the finger wheels of the other mould board the fingers of all of these wheels will move rearwardly through space between the mould boards. The shafts 22 project rearwardly beyond the mould boards and carry sprocket wheels 25 about which is trained a sprocket chain 26 so that rotary motion may be transmitted from one shaft 22 to the other. One of the shafts 22 is of greater length than the other and in addition to a sprocket wheel 25 also carries a sprocket wheel 27 about which is trained a sprocket chain 28. This sprocket chain is engaged about a sprocket wheel 29 carried by the drive shaft 6. Therefore, when the drive shaft is rotated by means of the sprocket chain 8 rotary motion will be imparted to the shaft 22 as indicated by arrows in Figure 1.

When this improved corn harvester is in use it is mounted on one side of a farm wagon having an open body and the wagon is driven across a field of growing corn longitudinally of the rows. The corn stalks pass between the mould boards and are guided into proper position by the tapered forward ends of the mould boards which engage the stalks at their lower ends. As the machine moves forwardly the corn stalks enter the space between the mould boards and are engaged by the fingers of the finger wheels. As previously explained, the finger wheels are so located and their rotation so timed that the corn stalks are successively engaged by fingers moving through the space between the mould boards from the two boards. Therefore, the stalks will be moved rearwardly in a very effective manner and moved longitudinally between the rollers. The rollers rotate and when an ear of corn growing upon a cornstalk is encountered by the rollers it will be snapped from the stalk. The fingers will also serve to move the ears of corn rearwardly to such a position that they may be conveyed upwardly and delivered into the wagon body. Hoods 30 are mounted upon the mould boards in covering relation to the shafts 22 and the gears and plates 10 so that the shaft and gears will be shielded.

From the foregoing description of the construction of my improved invention the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention what is claimed is:

1. In a corn harvester, picking mechanism comprising mould boards spaced transversely from each other, snapping rollers extending longitudinally of said mould boards between the same and rotatably mounted, finger wheels rotatably connected with said mould boards and having their fingers extending between the mould boards with the fingers of the wheel carried by one mould board disposed in staggered relation to the fingers of the wheel carried by the other mould board, and means to rotate said rollers and wheels.

2. In a corn harvester, picking mechanism comprising mould boards spaced transversely from each other, snapping means between said mould boards, finger wheels rotatably mounted and having their fingers extending between the mould boards above the snapping means, the finger wheel of one mould board being disposed in staggered relation to the finger wheel of the other mould board, and means to impart rotary motion to the finger wheels.

3. In a corn harvester, picking mechanism comprising mould boards spaced transversely from each other, snapping rollers extending longitudinally of said mould boards between the same and rotatably mounted in a plane beneath the mould board, finger wheels rotatably mounted beneath said mould boards and having their fingers extending between the mould boards above the snapping rollers, the finger wheels of one mould board being disposed in staggered relation to the finger wheels of the other mould board, and means to impart rotary motion to the snapping rollers and finger wheels.

4. In a corn harvester, picking mechanism comprising mould boards spaced transversely from each other, snapping rollers extending longitudinally of said mould boards between the same and rotatably mounted, finger wheels rotatably mounted and having their fingers extending between the mould boards above the snapping rollers, the finger wheels of one mould board being disposed in staggered relation to the finger wheels of the other mould board, and the wheels of each set each having its finger extending in staggered relation to fingers of adjoining wheels of the set and moving through the space between the mould boards in alternating relation to fingers of the wheels carried by the other mould board, and means to impart rotary motion to the snapping rollers and finger wheels.

5. In a corn harvester, picking mechanism comprising mould boards spaced transversely from each other, snapping rollers extending longitudinally of said mould boards between the same in a plane below the boards, mounting plates upon the upper faces of said mould boards, sleeves extending from said plates through said mould boards, hubs rotatably mounted in said sleeves and projecting from upper and lower ends thereof, finger wheels fixed upon the lower ends of said hubs beneath said mould boards to turn with the hubs, the fingers of said wheels projecting to move through space between the mould boards above said rollers when the hubs are rotated, and means to impart rotary motion to the rollers and hubs.

6. In a corn harvester, picking mechanism comprising mould boards spaced transversely from each other, snapping rollers extending longitudinally of said mould boards between the same in a plane below the boards, mounting plates upon the upper faces of said mould boards, sleeves extending from said plates through said mould boards, hubs rotatably mounted in said sleeves and projecting from upper and lower ends thereof, finger wheels fixed upon the lower ends of said hubs beneath said mould boards to turn with the hubs, the fingers of said wheels projecting to move through space between the mould boards above said rollers when the hubs are rotated, the wheels of each set being disposed out of a common plane whereby adjoining wheels may have their fingers pass in overlapping relation to each other when the hubs are rotated, and means to impart rotary motion to the rollers and hubs.

7. In a corn harvester, picking mechanism comprising mould boards spaced transversely from each other, snapping rollers extending longitudinally of said mould boards between the same in a plane below the boards, mounting plates upon the upper faces of said mould boards, sleeves extending from said plates through said mould boards, hubs rotatably mounted in said sleeves and projecting from upper and lower ends thereof, finger wheels fixed upon the lower ends of said hubs beneath said mould boards to turn with the hubs, the fingers of said wheels projecting to move through space between the mould boards above said rollers when the hubs are rotated, the hubs carried by one plate being disposed in staggered relation to the hubs carried by the other plate whereby the fingers of the wheels beneath one mould board may move through the space between the mould boards in alternating relation to fingers of the wheels below the other mould board and means to impart rotary motion to the rollers and hubs.

8. In a corn harvester, picking mechanism comprising mould boards spaced transversely from each other, snapping rollers extending longitudinally of said mould boards between the same in a plane below the board mounting plates upon the upper faces of said mould boards, sleeves extending from said plates through said mould boards, hubs rotatably mounted in said sleeves and projecting from upper and lower ends thereof, finger wheels fixed upon the lower ends of said hubs beneath said mould boards to turn with the hubs, the fingers of said wheels projecting to move through space between the mould boards above said rollers when the hubs are rotated, heads at the upper ends of said hubs limiting downward movement of the hubs through the sleeves and provided with pinions, shafts extending longitudinally of said mould boards above said plates and rotatably mounted, gears carried by said shafts and meshing with said pinions, and means to impart rotary motion to the rollers and shafts.

9. In a corn harvester, picking mechanism comprising mould boards spaced transversely from each other, snapping rollers extending longitudinally of said mould boards between the same in a plane below the boards, mounting plates upon the upper faces of said mould boards, sleeves extending from said plates through said mould boards, hubs rotatably mounted in said sleeves and projecting from upper and lower ends thereof, finger wheels fixed upon the lower ends of said hubs beneath said mould boards to turn with the hubs, the fingers of said wheels projecting to move through space between the mould boards above said rollers when the hubs are rotated, heads at the upper ends of said hubs limiting downward movement of the hubs through the sleeves and provided with pinions, shafts extending longitudinally of said mould boards above said plates, bearing for said shafts extending upwardly from said plates, bevelled gears fixed upon said shafts and meshing with said pinions, a drive shaft, means for transmitting rotary motion from said drive shaft to one of the hub actuating shafts, and means for transmitting rotary motion from said hub actuating shaft to the other.

10. In a corn harvester, picking mechanism comprising mould boards spaced transversely from each other, snapping rollers extending longitudinally of said mould boards between the same in a plane below the boards, mounting plates upon the upper faces of said mould boards, sleeves extending from said plates through said mould boards, hubs rotatably mounted in said sleeves and projecting from upper and lower ends thereof, finger wheels fixed upon the lower ends of said hubs beneath said mould boards to turn with the hubs, the fingers of said wheels projecting to move through space between the mould boards above said rollers when the hubs are rotated, heads at the upper ends of said hubs limiting downward movement of the hubs through the sleeves and provided with pinions, shafts extending longitudinally of said mould boards above said plates, bearing for said shafts extending upwardly from said plates, bevelled gears fixed upon said shafts and meshing with said pinions, bearings extending downwardly from said mould board, axles for said rollers mounted in the last mentioned bearings, one axle being extended to form a drive shaft, means for transmitting rotary motion from one roller to the other, means for transmitting rotary motion from said drive shaft to one of the hub actuating shafts, and means for transmitting rotary motion from said hub actuating shaft to the other.

In testimony whereof I affix my signature.

HARRY C. CHRISTIANCE.